(12) United States Patent
Han et al.

(10) Patent No.: US 11,641,498 B2
(45) Date of Patent: *May 2, 2023

(54) METHOD, SYSTEMS AND DEVICES FOR PROVIDING ADJUSTED VIDEO CONTENT ACCORDING TO VIEWING DISTANCE

(71) Applicants: AT&T Intellectual Property I, L.P., Atlanta, GA (US); Regents of the University of Minnesota, Minneapolis, MN (US)

(72) Inventors: Bo Han, Bridgewater, NJ (US); Cheuk Yiu Ip, Metuchen, NJ (US); Jackson Jarrell Pair, Hermosa Beach, CA (US); Feng Qian, Minneapolis, MN (US)

(73) Assignees: AT&T Intellectual Property I, L.P., Atlanta, GA (US); Regents of the University of Minnesota, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/513,202

(22) Filed: Oct. 28, 2021

(65) Prior Publication Data

US 2022/0060769 A1 Feb. 24, 2022

Related U.S. Application Data

(63) Continuation of application No. 16/875,548, filed on May 15, 2020, now Pat. No. 11,190,817.
(Continued)

(51) Int. Cl.
*H04N 21/24* (2011.01)
*H04N 21/2343* (2011.01)
(Continued)

(52) U.S. Cl.
CPC ..... *H04N 21/2402* (2013.01); *H04N 21/2187* (2013.01); *H04N 21/2343* (2013.01);
(Continued)

(58) Field of Classification Search
CPC .......... H04N 21/2402; H04N 21/2343; H04N 21/2393; H04N 21/4781; H04N 21/2187;
(Continued)

(56) References Cited

U.S. PATENT DOCUMENTS

2021/0035352 A1 2/2021 Harviainen
2021/0097667 A1 4/2021 Barua et al.
2021/0235140 A1 7/2021 Han et al.

OTHER PUBLICATIONS

Cuervo, Eduardo et al., "Kahawai: High-Quality Mobile Gaming Using GPU Offload", Microsoft Research, Duke University, University of Washington, May 18-22, 2015, 15 pages.
(Continued)

*Primary Examiner* — Yassin Alata
(74) *Attorney, Agent, or Firm* — Guntin & Gust, PLC; Atanu Das

(57) ABSTRACT

Aspects of the subject disclosure may include, for example, embodiments for obtaining video content from a video content server, determining a quality parameter for each of the plurality of adjusted video content, and adjusting the video content to generate the plurality of adjusted video content. Each of the plurality of adjusted video content comprises a different point cloud density according to the quality parameter. Further embodiments can include receiving a request for the video content from a video content application on a communication device, and determining a distance from a viewpoint to a point-cloud object on the video content application of the communication device. Additional embodiments can include selecting an adjusted video content based on the distance from the viewpoint to the point-cloud object and the quality parameter of the
(Continued)

adjusted video content, and providing the adjusted video content to the communication device for presentation. Other embodiments are disclosed.

20 Claims, 13 Drawing Sheets

Related U.S. Application Data

(60) Provisional application No. 62/965,007, filed on Jan. 23, 2020.

(51) Int. Cl.
  *H04N 21/239* (2011.01)
  *H04N 21/478* (2011.01)
  *H04N 21/2187* (2011.01)
  *H04N 21/81* (2011.01)
  *H04N 21/2385* (2011.01)
  *H04N 21/472* (2011.01)

(52) U.S. Cl.
  CPC ..... *H04N 21/2385* (2013.01); *H04N 21/2393* (2013.01); *H04N 21/472* (2013.01); *H04N 21/4781* (2013.01); *H04N 21/816* (2013.01)

(58) Field of Classification Search
  CPC . H04N 21/816; H04N 21/2385; H04N 21/472
  See application file for complete search history.

(56) References Cited

OTHER PUBLICATIONS

Kowalski, Marek et al., LiveScan3D: A Fast and Inexpensive 3D Data Acquisition System for Multiple Kinect v2 Sensors. In Proceedings of International Confeerence on 3D Vision, 2015, pp. 1-9.

Maglo, Adrien et al., 3D Mesh Compression: Survey, Comparisons, and Emerging Trends. ACM Computing Surveys, 47(3), 2015, 41 pages, Apr. 2015.

Peng, Jingliang et al., Technologies for 3D mesh compression: A survey. Journal of Visual Communication and Image Representation, 16(6):688-733, 2005.

Wang, Z. et al., "Image Quality Assessment: From Error Visibility to Structural Similarity", IEEE Transactions on Image Processing, vol. 13, Issue 4, Apr. 2004, 14 pages.

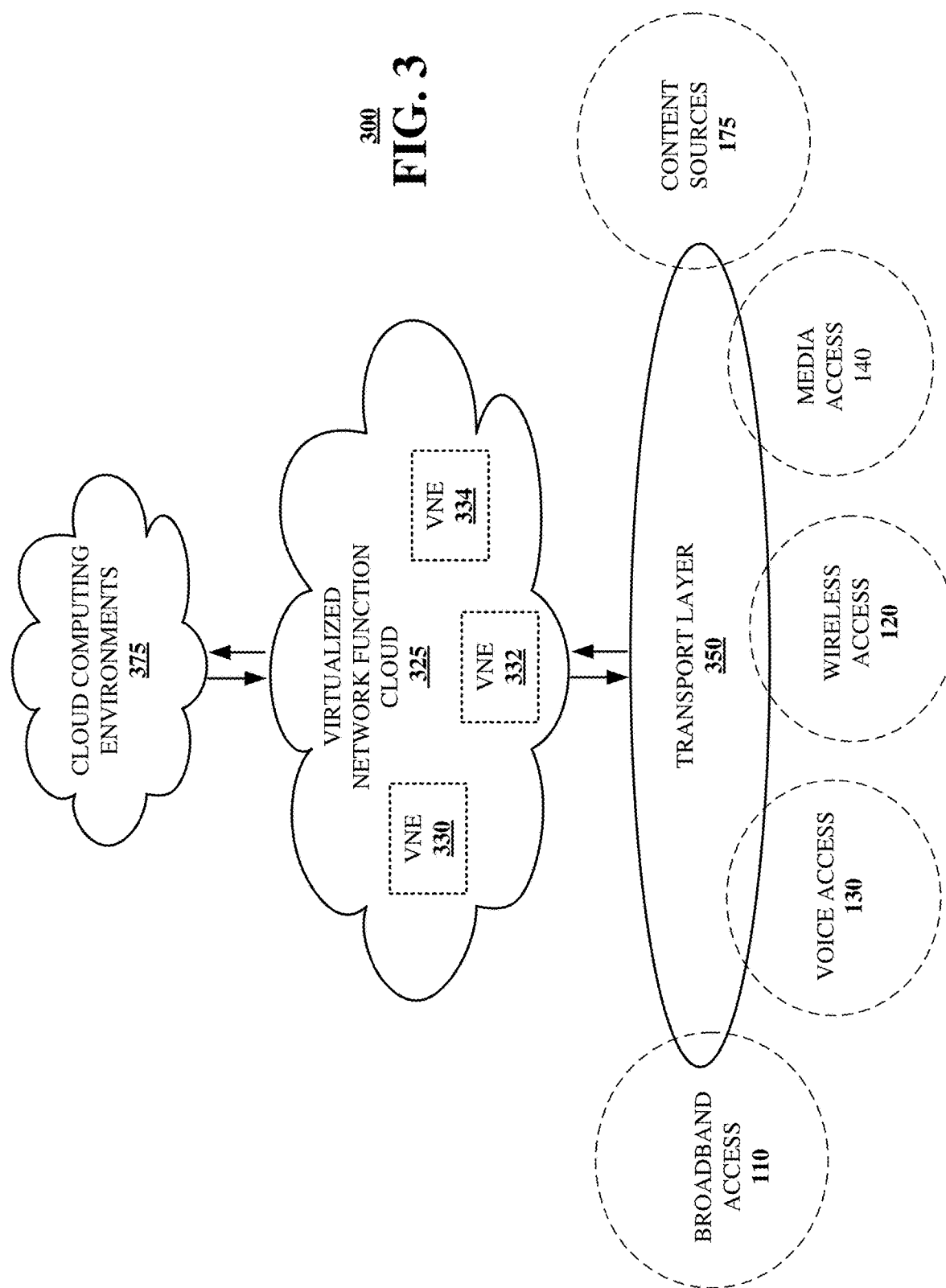

METHOD, SYSTEMS AND DEVICES FOR PROVIDING ADJUSTED VIDEO CONTENT ACCORDING TO VIEWING DISTANCE

CROSS REFERENCE TO RELATED APPLICATIONS

This application is a continuation of U.S. patent application Ser. No. 16/875,548 filed May 15, 2020, which claims priority to U.S. Provisional Patent Application No. 62/965,007 filed Jan. 23, 2020. The contents of each of the foregoing are hereby incorporated by reference into this application as if set forth herein in full.

FIELD OF THE DISCLOSURE

The subject disclosure relates to methods, systems, and devices for providing adjusted video content according to viewing distance.

BACKGROUND

Conventional systems for providing and presenting video content can include a communication device presenting video content using a video content application to a user. The video content can be obtained from a video content server. The video content is provided by the video content server with as much quality and resolution as possible to provide the best user experience.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
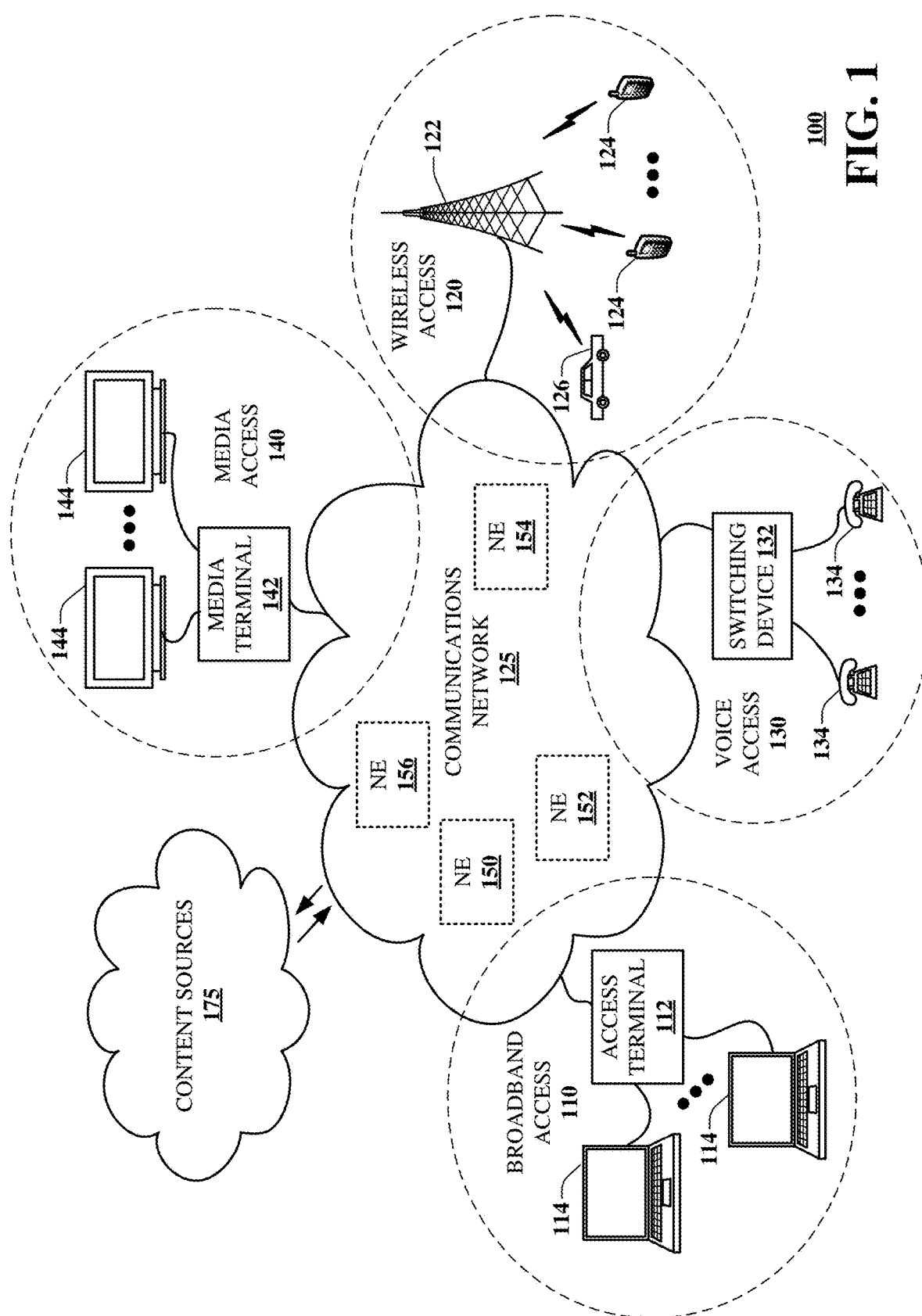
FIG. 1 is a block diagram illustrating an exemplary, non-limiting embodiment of a communications network in accordance with various aspects described herein.

The subject disclosure describes, among other things, illustrative embodiments for obtaining video content from a video content server over a communication network, and determining a quality parameter for each of a plurality of adjusted video content, and adjusting the video content to generate the plurality of adjusted video content. Each of the plurality of adjusted video content comprises a different point cloud density according to the quality parameter. Further embodiments can include receiving, over the communication network, a request for the video content from a video content application on a communication device, and determining a distance from a viewpoint to a point-cloud object on the video content application of the communication device. Additional embodiments can include selecting an adjusted video content from the plurality of adjusted video content based on the distance from the viewpoint to the point-cloud object and the quality parameter of the adjusted video content, and providing, over the communication network, the adjusted video content to the communication device. The communication device presents the adjusted video content using the video content application. Other embodiments are described in the subject disclosure.

One or more aspects of the subject disclosure include a device comprising a processing system including a processor, and a memory that stores executable instructions that, when executed by the processing system, facilitate performance of operations. The operations can comprise obtaining video content from a video content server over a communication network, determining a quality parameter for each of a plurality of adjusted video content, and adjusting the video content to generate the plurality of adjusted video content. Each of the plurality of adjusted video content can comprise a different point cloud density according to the quality parameter. Further operations can comprise receiving, over the communication network, a request for the video content from a video content application on a communication device, and determining a distance from a viewpoint to a point-cloud object on the video content application of the communication device. Additional operations can comprise selecting an adjusted video content from the plurality of adjusted video content based on the distance from the viewpoint to the point-cloud object and the quality parameter of the adjusted video content, and providing, over the communication network the adjusted video content to the communication device. The communication device can present the adjusted video content using the video content application.

One or more aspects of the subject disclosure include a machine-readable medium, comprising executable instructions that, when executed by a server including a processor, facilitate performance of operations. The operations can comprise obtaining video content from a video content server over a communication network, determining a quality parameter for each of a plurality of adjusted video content, and adjusting the video content to generate a plurality of adjusted video content. Each of the plurality of adjusted video content comprises a different point cloud density according to the quality parameter. Further operations can comprise receiving, over the communication network, a request for the video content from a video content application on a communication device, and determining a distance from a viewpoint to a point-cloud object on the video content application of the communication device. Additional operations can comprise determining an available bandwidth of the communication network between the server and the communication device, selecting an adjusted video content from the plurality of adjusted video content based on the distance from the viewpoint to the point-cloud object, the quality parameter of the adjusted video content, and the available bandwidth, and providing, over the communication network, the adjusted video content to the communication device. The communication device can present the adjusted video content using the video content application.

One or more aspects of the subject disclosure include a method. The method can comprise obtaining, by a server including a processor, video content from a video content server over a communication network, and receiving, by the server, user-generated input from a communication device. Further, the method can comprise determining, by the server, a quality parameter for each of a plurality of adjusted video content according to the user-generated input, and adjusting, by the server, the video content to generate the plurality of adjusted video content. Each of the plurality of adjusted video content comprises a different point cloud density according to the quality parameter. In addition, the method can comprise receiving, by the server, over the communication network, a request for the video content from a video content application on the communication device, and determining, by the server, a distance from a viewpoint to a point-cloud object on the video content application of the communication device. Also, the method can include selecting, by the server, an adjusted video content from the plurality of adjusted video content based on the distance from the viewpoint to the point-cloud object and the quality parameter of the adjusted video content, and providing, by the server, over the communication network, the adjusted video content to the communication device. The communication device can present the adjusted video content using the video content application.

Referring now to FIG. 1, a block diagram is shown illustrating an example, non-limiting embodiment of a system 100 in accordance with various aspects described herein. For example, system 100 can facilitate in whole or in part providing adjusted video content according to point cloud density. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
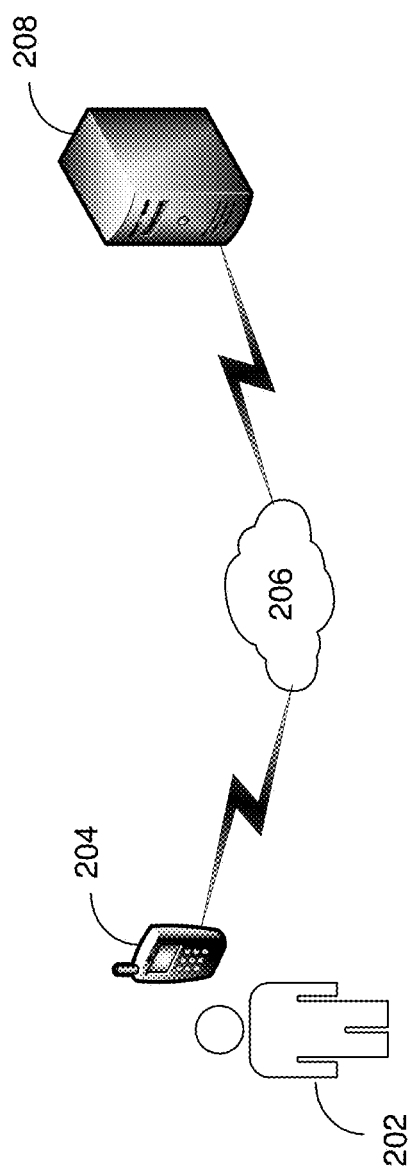
FIGS. 2A-2F and FIG. 2H are block diagrams illustrating example, non-limiting embodiments of a system functioning within the communication network of FIG. 1 in accordance with various aspects described herein.

FIGS. 2A-2F are block diagrams illustrating example, non-limiting embodiments of a system functioning within the communication network of FIG. 1 in accordance with various aspects described herein. Referring to FIG. 2A, in one or more embodiments, the system 200 can include a server 208 communicatively coupled to a communication device 204 of a user 202 over a communication network 206. The server 208 can be an edge server for a mobile communication network or the server 208 can be a server in a content delivery network (CDN) that can provide video content to the communication device 204 over communication network 206. The communication device 204 can be a mobile device, mobile phone, wearable device, smartwatch, laptop computer, desktop computer, video game system, virtual reality device, augmented reality device, or any other computing device. Further, a video application can be operating on the communication device 204 to present the video content obtained from the server 208. In some embodiments, the video content can comprise volumetric video content, which includes objects that are generated using a point cloud. A point cloud is a set of 3-D points with attributes such as color or intensity. Examples of a video content application can be a virtual reality video content application, an augmented reality video content application, a media content application, a video game application, all of which can play point cloud volumetric video content.

Figure 2B:
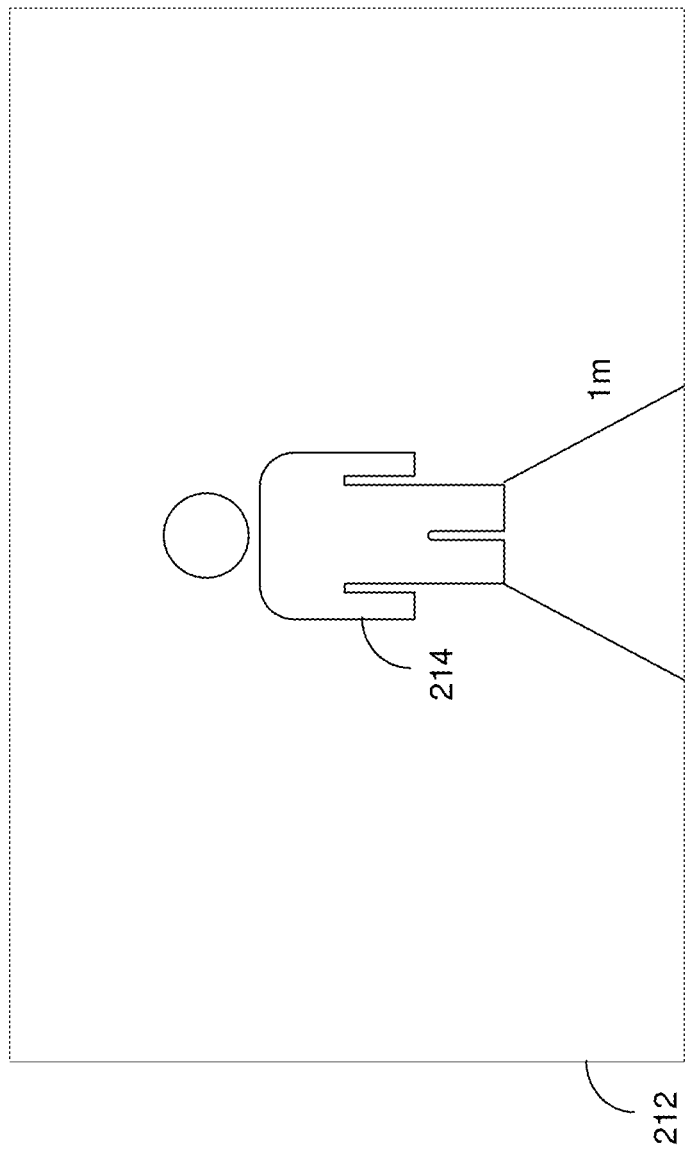

Referring to FIG. 2B, video content 212 can be presented on the communication device 204 of an object 214 (e.g., person, character, etc.) with a point cloud density of 100%. That is, the server 208 provides video content 212 to the communication device 204 with a highest point cloud density as possible to provide the best resolution of the video content 212 such that the user 202 can have the best user experience as possible. However, providing high point cloud density video content (e.g., 100% point cloud density) uses considerable bandwidth of the communication network 206 between the server 208 and communication device 204. Further, in some situations, the user may not need to be provided a 100% point cloud density video content to provide a high level user experience, as described herein. Note, the distance from the viewpoint to the point cloud object can be 1 meter.

Figure 2C:
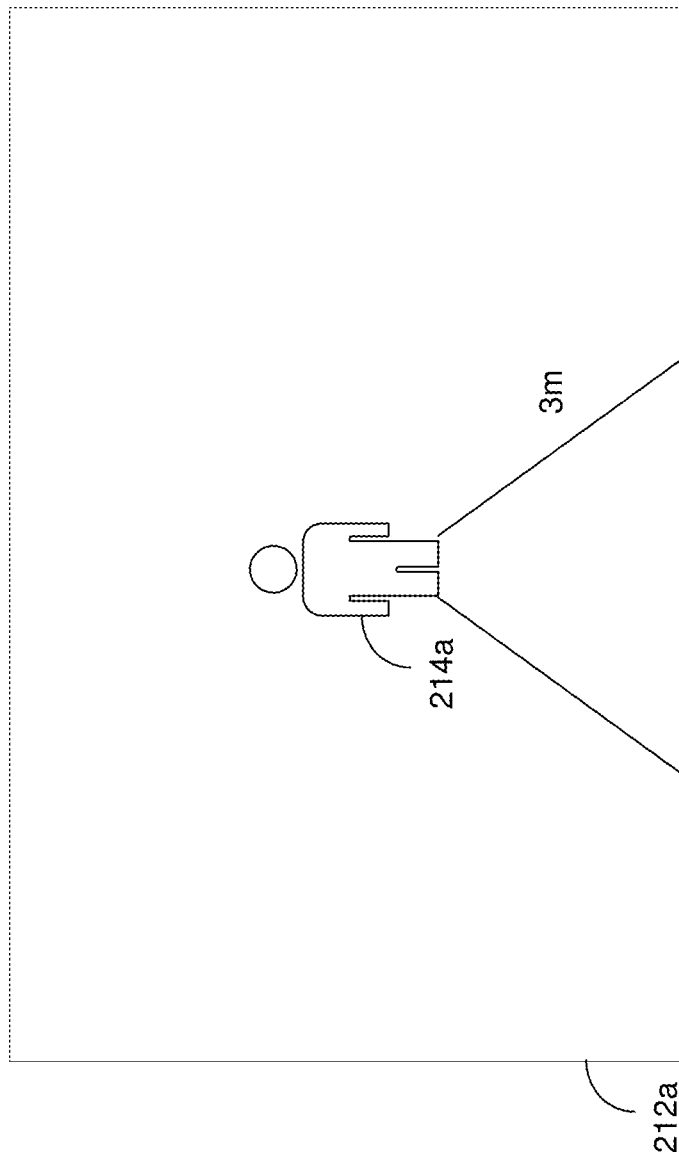

Referring to FIG. 2C, in one or more embodiments, the object 214a within the video content 212a can be at a further distance with respect to the viewpoint of a user 202 viewing object 214 in the video content 212 as shown in FIG. 2B. For example, the video content 212, 212a comprises video game content. Object 214, 214a can be an avatar for the user 202 playing the video game. Further, the avatar can be moved within the video game such that it has at a different distance (e.g., 3 meters) from the viewpoint of the player/user 202 in one portion of the video content 212 than in another portion of the video content 212a.

Figure 2D:
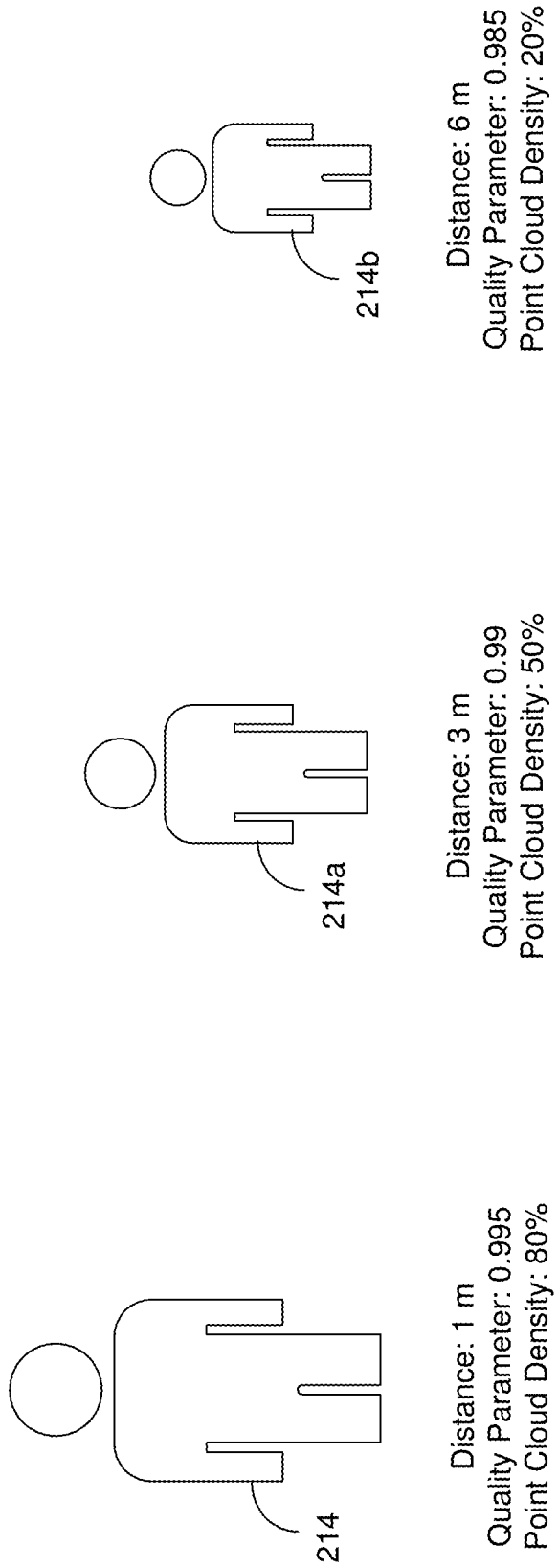

Referring to FIG. 2D, in one or more embodiments, video content can be adjusted according to a quality parameter and the distance from the viewpoint of a user 202 and the point cloud object within the video content. For example, it can be determined that an increase in point cloud density of an object or portion of the video content does not increase the quality parameter of the video content at a certain viewpoint-to-point cloud object distance. Thus, in such video content, there is no need to provide the highest point cloud density of objects (e.g., 100% point cloud density) because it would not increase a user's experience in enjoying the video content. That is, from that distance, the user cannot discern the quality of the object in the video content presented at a high resolution (e.g., high point cloud density) as opposed to the object in the video content presented at a lower resolution (e.g., lower point cloud density). Therefore, by reducing the point cloud density to a value less than 100% can reduce the bandwidth used by the video content of communication network 206 when transmitted from the server 208 to the communication device 204. For example, at a distance of 1 m from the viewpoint and the point cloud object 214, a point cloud density of 80% provides a quality parameter of 0.995. In some embodiments, a quality parameter above a threshold of 0.98 provides a user experience that is satisfactory to a user 202. Thus, the server 208 can adjust the video content (or a portion thereof) according to the quality parameter such that objects within the video content have a point cloud density less than 100% but still a quality parameter above the threshold. Further, an object 214a within video content at a distance of 3 m from the viewpoint and the point cloud object 214a can be adjusted to have a point cloud density of 50% but still have a quality parameter of 0.99 that is still above the threshold of 0.98. In addition, an object 214b within a video content at a distance of 6 m from the viewpoint and the point cloud object 214b can be adjusted to have a point cloud density of 20% but still have a quality parameter of 0.985 that is above the threshold of 0.98. Thus, for both point cloud objects 214a, 214b, the server 208 can adjust the video content (or a portion thereof) according to the quality parameter such that objects within the video content have a point cloud density less than 100% but still a quality parameter above the threshold of. 0.98. The quality parameter can be a peak signal-to-noise ratio (PSNR), structural similarity index (SSIM), or any other quality parameter.

In one or more embodiments, volumetric video content can be streamed over wireless communication networks from a server 208 to a communication device 204. However, for example, streaming volumetric video content can be demanding on bandwidth. In some embodiments, their wireless delivery can be supported on 5G networks. Moreover, unlike regular pixel videos that can be decoded using dedicated hardware, today decoding volumetric videos can be done by software and thus incurs a computational overhead. Some embodiments can include a method for determining the distance based visibility of point cloud frames in volumetric video content and then choosing the point cloud density level accordingly with the goal of optimizing the bandwidth footprint of volumetric video content streaming and maintaining the quality of user experience. The rationale behind such embodiments is that, when the viewpoint is far away, the perceived object in a volumetric video frame (e.g., a point cloud) can become small, as neighboring 3-D points may be projected to the same 2-D pixel on the display. As a result, reducing the point cloud density level of the far-away point cloud brings no or little degradation of the perceived quality. Further embodiments can determine this distance visibility through a data-driven approach, which consists of an offline and an online phase. At the offline phase, embodiments build a model to identify the relationship between geometric properties (distance, angle, and point cloud density level) and visual qualities. Embodiments then utilize such a model for the selection of the point cloud density level without affecting the quality of experience (QoE).

In one or more embodiments, recent advances in wireless technology such as mmWave 5G have fueled a wide range of emerging applications. Among them, mobile video streaming can play a significant role. Embodiments can include investigating a type of video content called volumetric video content. Volumetric video content streaming can be an enabling technology for mixed reality (MR), and can become an application used in 5G networks. The volumetric video content market can grow from $578 million in 2018 to $2.78 billion by 2023. Major video content providers can commercialize volumetric video content streaming services.

Unlike other video content (including 360-degree panoramic video content) that comprise 2-D pixels, volumetric video content is 3-D. Each frame of volumetric video content can be a scene that is comprised of 3-D points or meshes (polygons). During playback, viewers can freely navigate themselves with six degrees of freedom (6DoF) movement, 3DoF of translational movement (X, Y, and Z) and another 3DoF corresponding to rotational movement (yaw, pitch, and roll). Among various volumetric data formats, embodiments can include the point cloud representation where each frame is a set of unsorted 3-D points with attributes such as color and intensity. Point cloud can be a popular volumetric data format due to its flexibility and simplicity. Nevertheless, the concepts of the embodiments described herein are applicable to other volumetric video formats such as 3-D mesh.

Volumetric video content can enable numerous applications that cannot be supported by other video content. For example, by shooting/capturing high-resolution volumetric video content of a family member's daily activity, one may later view it from different positions as if she/he was standing next to the viewer. In another example, a surgery can be broadcasted as a live volumetric feed, allowing medical students as viewers to get an immersive telepresence experience.

In one or more embodiments, besides the content format, volumetric video content can differ from other types of video content in other aspects including capture, streaming, and analytics. Embodiments can address streaming applications. Streaming volumetric video content can include different embodiments. As mentioned above, streaming volumetric video content can be bandwidth demanding and volumetric video content can be decoded using dedicated hardware. Today decoding volumetric videos can only be done by software and thus incurs a computational overhead. Further, adaptive-bitrate (ABR) video streaming systems typically have some components such as rate adaptation, QoE inference, and buffer control.

In one or more embodiments, volumetric video content can be captured using RGB-D cameras (D for depth), e.g., various LIDAR scanners. They are equipped with depth sensors and can acquire 3-D data from different viewpoints. The data captured from multiple cameras can then be merged to form the entire scene through proper synchronization, calibration, and filtering. Embodiments can include enhanced version of LiveScan3D to capture volumetric video content.

In one or more embodiments, 3-D mesh and point cloud are two popular representations of volumetric video content. 3-D mesh models the structural build of an object using a collection of vertices, edges, and meshes (polygons). A point cloud is a set of 3-D points with attributes such as color or intensity. Compared to 3-D mesh, point cloud is a more flexible and simpler representation, because it involves only unstructured points, and does not need to maintain the topological consistency (a requirement for 3-D mesh).

In one or more embodiments, compression of 3-D point clouds can be done using various embodiments. Most existing schemes leverage either octree-based compression or k-d tree based compression for point clouds. In an octree data structure, each non-leaf node has exactly eight children. When compressing a point cloud with an octree, embodiments recursively divide the 3-D space into eight subregions. Each node of the octree corresponds to a sub-region with at least one point. A leaf node gives the best estimation of the position(s) of the point(s) it contains. Embodiments can control the levels of detail by setting the height of the tree. In addition to compressing a single point cloud (or a single point cloud video frame), the octree can be extended to perform delta encoding between two point clouds (i.e., inter-frame compression for a point cloud video). A k-d tree is a binary tree data structure that organizes points in a k-dimensional space. It recursively creates a splitting hyperplane to divide the 3-D space into two subspaces. It then encodes the points in each subspace with an optimal number of bits.

Figure 2E:
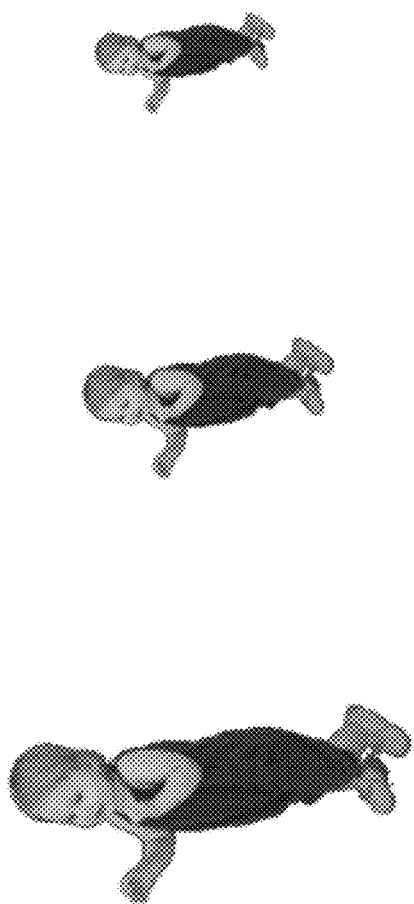

In one or more embodiments, a unique property of volumetric video content is that a user can view their content at different distances. When the viewpoint is far away, the perceived point cloud can become small, as neighboring 3-D points may be projected to the same 2-D pixel on the display. For example, as shown in FIG. 2E, when a viewer watches a point cloud stream at 1 meter distance, a video application presenting volumetric video content may need to render the point cloud with 100% of points to achieve the best visual quality. However, when the same point cloud stream is viewed at 3-meter distance, rendering only 60% of points may be enough to achieve almost the same visual quality as rendering 100% of points. When the distance further increases to 5 meters, rendering only 20% of points should be enough for the same visual quality. Thus, reducing the point cloud density level brings no or little degradation of the perceived quality. Embodiments dynamically select the point cloud density level of a point cloud video frame according to the viewpoint-to-point-cloud distance.

Embodiments can include determining the distance visibility to establish the mappings between the distance and the point cloud density level and thus select the proper density level for a given viewing distance that leads to satisfactory user experience. Embodiments can address this through a data-driven approach, which includes an offline and an online phase. At the offline phase, embodiments sample many point cloud frames and "view" (i.e., render) them at different distances, angles, and point cloud density levels in an automated fashion, thus creating snapshots of different viewports. Embodiments then assess the perceptual quality for these 2-D snapshots using objective metrics such as structural similarity index (SSIM). In this way, embodiments obtain a large number of mappings from geometric properties (distance, angle, and point cloud density level) to visual qualities. Further embodiments utilize such mappings to build a model that dictates the selection of the point cloud density level without affecting the QoE. Additional embodiments build a model for each video, but depending on the content, it may also be feasible to construct a model for a category of video content or a portion of video content. In the online phase, embodiments utilize the model and the geometric properties of the predicted viewpoint to calculate in real time the proper point cloud density level for each point cloud video frame.

Embodiments can include an offline phase that selects 10 frames (point clouds) for a particular volumetric video content. For each point cloud, 6,000 snapshots can be captured by varying the translational positions—20 values of X, 20 values of Z, 3 values of Y (given that viewers seldom move vertically), and 5 point cloud density levels (sampling 20% to 100% of points in each point cloud video frame). To reduce the feature space and thus the model building time, embodiments fix the viewing direction to be always toward the center of the point cloud. The rationale through empirical observation is that the rotational movement has a much smaller impact on the perceptual quality compared to the translational movement, which directly changes the viewpoint-to-point-cloud distance.

For each of the 48,000 snapshots rendered from point clouds without the highest point cloud density level (100%), embodiments calculate their SSIM indexes, using the corresponding snapshots with the highest point cloud density level as the ground truth. We then visualize the model as in FIG. 2F, which plots the relationship between the viewpoint-to-point-cloud distance and the SSIM for all 48,000 snapshots. As shown, given a point cloud density level, the SSIM statistically improves as the distance increases. An SSIM higher than 0.98 means that the rendered content is visually lossless (e.g., satisfies a user experience). To determine the point cloud density level at a given distance d, embodiments can apply an SSIM threshold of 0.98, and select the lowest point cloud density level l such that all snapshots with d and l bear SSIM indexes of at least 0.98. In other words, embodiments can require that at distance d, regardless of the translational position, the viewer can always enjoy such a high SSIM.

Figure 2F:
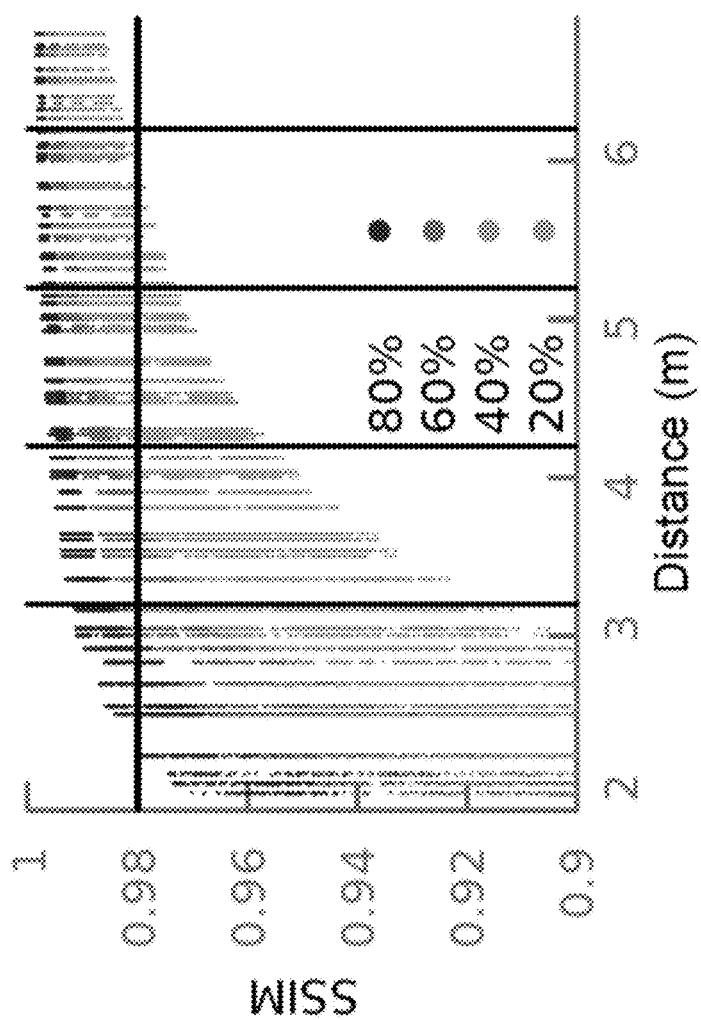

In one or more embodiments, FIG. 2F can indicate that given a point cloud density level, its lowest SSIM increases almost monotonically as the distance increases. This allows embodiments to conveniently simplify the model into discrete mappings from distance ranges to point cloud density levels. In the example shown in FIG. 2F, the corresponding mappings are [0, 3.2)→100%, [3.2, 4.2)→80%, [4.2, 5.2)→60%, [5.2, 6.2)→40%, and [6.2, ∞)→20%. They correspond to the vertical lines in FIG. 2F. Note the above model construction procedure is a one-time effort per video, and can be fully automated. Embodiments can apply it to other captured video content and achieve similar results. Then in the online phase, for each point cloud video frame p, embodiments can use the (predicted) viewpoint-to-point-cloud distance to lookup a point density level, and use that level for p if it is lower than the initial point cloud density level.

Figure 2G:
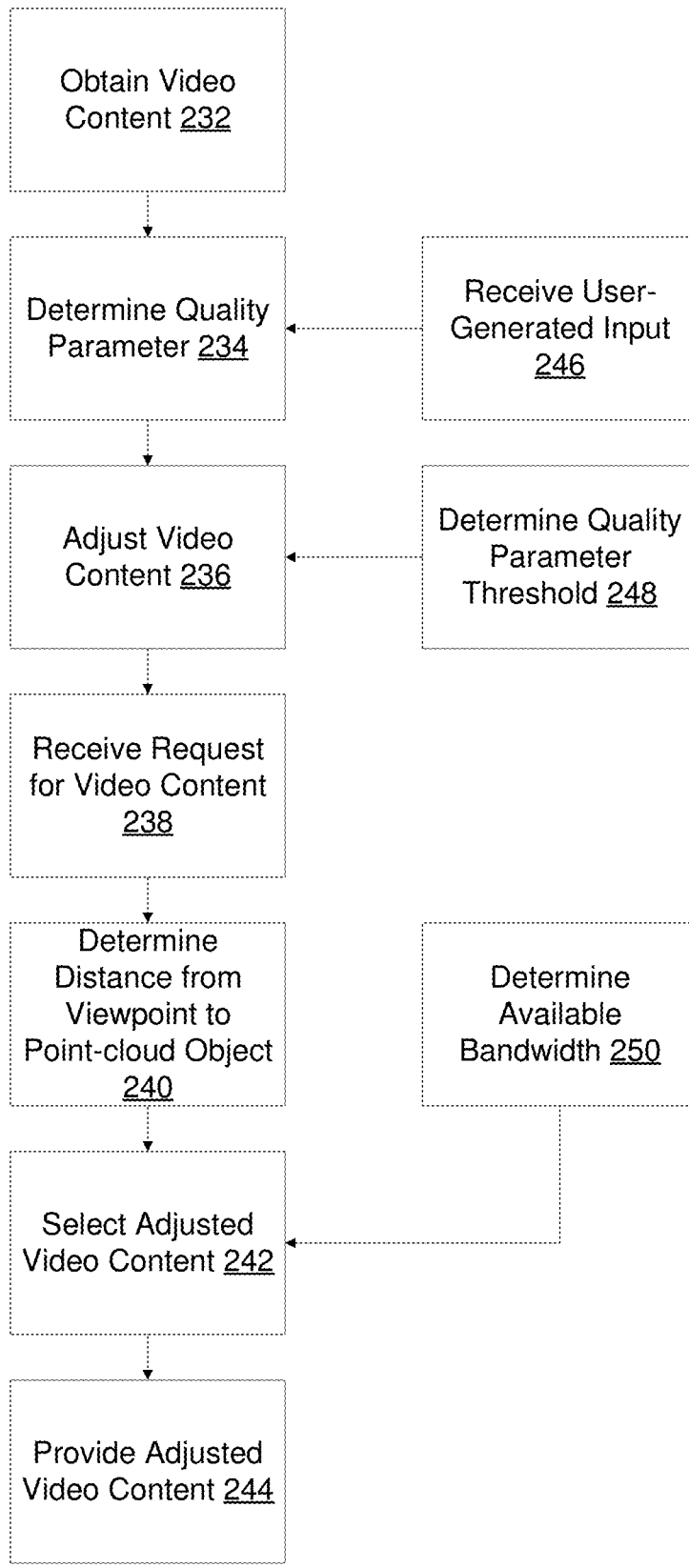
FIG. 2G depicts an illustrative embodiment of a method in accordance with various aspects described herein.

FIG. 2G depicts an illustrative embodiment of a method 230 in accordance with various aspects described herein. The method 230 can be implemented by a server shown in FIG. 2A. Further, the method 230 can include the server, at 232, obtaining video content from a video content server over a communication network. In addition, the method 230 can include the server, at 234, determining a quality parameter for the video content. In some embodiments, the method 230 can include the server determining the quality parameter for each of a plurality of adjusted video content. The quality parameter can comprise a structural similarity index (SSIM) or a peak signal to noise ratio (PSNR). Also, the method 230 can include the server, at 236, adjusting the video content to generate the plurality of adjusted video content. Each of the plurality of adjusted video content comprises a different point cloud density according to the quality parameter. Further, the method 230 can include the server, at 238, receiving, over the communication network, a request for the video content from a video content application on a communication device. In addition, the method 230 can include the server, at 240, determining a distance from a viewpoint to a point-cloud object within the video content application of the communication device. Also, the method 230 can include the server, at 242, selecting an adjusted video content from the plurality of adjusted video content based on the distance from the viewpoint to the point-cloud object and the quality parameter of the adjusted video content. Further, the method 230 can include the server, at 244, providing, over the communication network, the adjusted video content to the communication device. The communication device presents the adjusted video content using the video content application.

In one or more embodiments, the method 230 can include the server, at 246, to receiving user-generated input over a communication network from the communication device. In other embodiments, the method 230 can include the server determining the quality parameter according to the user-generated input. In some embodiments, the selecting of the adjusted video content can comprise selecting the adjusted video content in response to receiving user-generated input. In further embodiments, the user-generated input can comprise instructions for magnification of the video content.

In one or more embodiments, the method 230 can include the server, at 248, determining a quality parameter threshold. Further, the adjusting of the video content can comprise adjusting the video content according to the quality parameter threshold. In addition, each of the plurality of adjusted video content satisfies the quality parameter threshold. In some embodiments, the method can include the server determining a quality parameter threshold, wherein the adjusting of the video content comprises adjusting the video content according to the quality parameter threshold resulting in the plurality of adjusted video content.

In one or more embodiments, the method 230 can include the server, at 250, determining an available bandwidth of the communication network between the device and the communication device. Further, the selecting of the adjusted video content can comprise selecting the adjusted video content based on the available bandwidth.

In some embodiments, the video content comprises one of augmented reality video content, virtual reality video content, live video content, or recorded video content. In further embodiments, the video content application comprises a video game application.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Portions of some embodiments can be combined with portions of other embodiments.

Embodiments can include integrating building blocks such as encoding, segmentation, viewport prediction, Viewport Visibility (VV), Occlusion Visibility (OV) and/or Distance Visibility (DV) into a system. A portion of logic for the system can reside on a mobile device that wirelessly communicates with a stateless server (other portion of logic can reside on the server). Embodiments can be evaluated over diverse networks (WiFi, emulated LTE, and commercial 5G), users (MR headset and smartphone viewers), and content (4 different Point Cloud (PtCl) videos), using both objective metrics (structural similarity index, SSIM) and subjective scores rated by real viewers.

When bandwidth is sufficiently high, VV, OV, and DV can reduce the average data usage for PtCl streaming by 29.1%, 11.4%, and 7.4% (up to 84.5%, 14.7%, and 46.9%), respectively, compared to the corresponding baseline without the optimization. Meanwhile, ViVo incurs virtually no perceived quality loss (SSIM>0.98). For example, jointly applying all three optimizations yields a data saving of 41.8% and 39.5% on average (up to 70.1% and 84.5%) for two categories of PtCl videos, compared to the baseline fetching the entire PtCl. The perceived quality loss also remains negligible. In another example, on commercial 5 GmmWave networks (~50 m line-of-sight), ViVo reduces the data usage by 36% and 39% (compared to the above baseline) when playing two PtCl videos and significantly shortens stall time, while also maintaining nearly perfect visual quality. In a further example, when network bandwidth is constrained or fluctuating, subjective scores rated by 12 participants watching 144 pairs of videos (ViVo and baseline) indicate that ViVo outperforms (equals) the baseline for 62.5% (28.5%) of the QoE ratings.

One or more embodiments can include PtCl encoding, decoding, segmentation, and viewport movement patterns in the mobile context; three visibility-aware optimizations that effectively reduce mobile data usage and decoding overhead for volumetric video streaming; and system design, implementation, and evaluation of ViVo, a full-fledged, ready-to-deploy volumetric video streaming system for commodity mobile devices. ViVo provides a platform for volumetric video streaming incorporating algorithms such as sophisticated 6DoF viewport prediction and visibility-aware optimization schemes.

In one or more embodiments, streaming volumetric videos can be resource-demanding. Raw (uncompressed) PtCl data can be prohibitively large for streaming over wireless networks. The representation of a 3-D point typically takes 15 bytes: 4 bytes for each of the (X, Y, Z) position dimensions, and 1 byte for each of the (R, G, B) color dimensions. Thus, for instance, streaming a volumetric video with 200K points per frame at 30 FPS requires 720 Mbps of bandwidth (15 bytes×200K points per frame×30 frames per second×8 bits per byte). Compression (encoding) is thus essential for PtCl streaming.

In one or more embodiments, compressing the PtCl stream cannot provide a satisfactory QoE, because of either high decoding overhead or poor network conditions that occur in wireless networks—even in 5G due to its vulnerability to blockage and attenuation. Regarding the decoding overhead, it can be quantitatively shown that the communication device-side decoding may become the performance bottleneck even on high-end communication devices with multi-core processors, due to the inherent complexity of PtCl compression.

One or more embodiments further reduce bandwidth consumption and client-side (communication device-side) processing overhead for streaming PtCl volumetric videos to mobile devices. Embodiments that include ViVo can include three key optimizations for achieving this goal: VV, OV, and DV.

Optimizations such as VV and OV require selectively fetching a portion of (encoded) PtCl at a specified point density level. This can be achieved by segmenting the entire PtCl into small blocks or cells, but the segmentation itself may incur high overhead. Further, ViVo can require robust viewport prediction (VP) to facilitate content prefetching and reduce the motion-to-photon delay. Embodiments can characterize real users' viewport movement patterns when watching volumetric videos, and an include 6DoF VP techniques. Because a portion of ViVo's logic resides on communication devices (e.g., mobile devices), they need to be sufficiently lightweight, otherwise optimizations themselves may become the performance bottleneck. Embodiments can include several different algorithms to address this performance bottleneck.

In one or more embodiments, a property of volumetric videos is that a user can view the content at different distances. When the viewpoint is far away, the perceived PtCl can be become small and neighboring 3-D points may be projected to the same displayed 2-D pixel. In such embodiments, reducing the point density level (PDL) brings no or little degradation of the perceived quality. Thus, embodiments can select each cell's PDL according to the viewpoint-to-cell distance. Embodiments can establish the mappings between the distance and the PDL. Embodiments address this through a data-driven approach, which consists of an offline and an online phase. At the offline phase, embodiments sample many PtCl frames and "view" (i.e., render) them at different distances, angles, and PDLs, thus creating snapshots of different viewports. Embodiments then assess the perceptual quality for these 2-D snapshots using objective metrics such as SSIM. In this way, embodiments obtain a large number of mappings from geometric properties (distance, angle, and PDL) to visual qualities. Embodiments can utilize such mappings to build a model that dictates the PDL selection without affecting the QoE. Embodiments of ViVo can build a model for each video, but depending on the content, it may be feasible to construct a model for a category of videos or a part of a video. In the online phase, embodiments of ViVo can utilize the model and the geometric properties of the predicted viewpoint to calculate in real time the proper PDL for each cell.

In one or more embodiments, implementing an DV algorithm can be shown through an example for video. In the offline phase, embodiments can select 10 frames (PtCls) from the video. For each PtCl, embodiments can take 6,000 snapshots by varying the translational positions—20 values of X, 20 values of Z, 3 values of Y (given that viewers seldom move vertically), and 5 PDLs (sampling 20% to 100% of points in each cell). To reduce the feature space and thus the model building time, embodiments can fix the viewing direction to be always toward the center of the PtCl. The rationale is our empirical observation that rotational movements have a much smaller impact on the perceptual quality than translational movements, which directly changes the viewpoint-to-PtCl distance. For each of the 48,000 snapshots rendered from PtCls without the highest PDL (100%), embodiments can calculate their SSIM indexes, using the corresponding snapshots with the highest PDL. Embodiments can then visualize the model in FIG. 2F, which plots the relationship between the viewpoint-to-PtCl distance and the SSIM for all 48,000 snapshots. As shown, given a PDL, the SSIM statistically improves as the distance increases. An SSIM higher than 0.98 means that the rendered content is visually lossless. To determine the PDL at a given distance d, embodiments apply an SSIM threshold of 0.98, and select the lowest PDL l such that all snapshots with d and l bear SSIM indexes of at least 0.98. FIG. 2F indicates that given a PDL, its lowest SSIM increases almost monotonically as the distance increases. This allows embodiments to conveniently simplify the model into discrete mappings from distance ranges to PDLs. In the example shown in FIG. 2F, the mappings are [0, 3.2)→100%, [3.2, 4.2)→80%, [4.2, 5.2)→60%, [5.2,6.2)→40%, and [6.2, ∞)→20%. They correspond to the vertical lines in FIG. 2F. The above model construction procedure is a one-time effort per video, and can be fully automated. Embodiments apply it to other videos in the dataset. Then in the online phase, for each cell c, embodiments can use the (predicted) viewpoint-to-cell distance to lookup a PDL, and use that level for c if it is lower than the initial level passed to the DV algorithm. The size of the lookup table is determined by the number of PDLs, which, similar to the encoding bitrate ladder for adaptive bitrate (ABR) streaming, is usually small (e.g., <10) in practice.

Some embodiments can combine at least two of VV, OV, and DV and other embodiments can implement them separately. The three optimizations focus on different aspects of volumetric data fetching and rendering and can be jointly leveraged in a natural manner. Specifically, ViVo first applies DV to obtain an initial point density level for each cell, followed by VV and OV, which may further reduce the cells' density levels depending on the viewport and the occlusion levels, respectively.

Figure 2H:
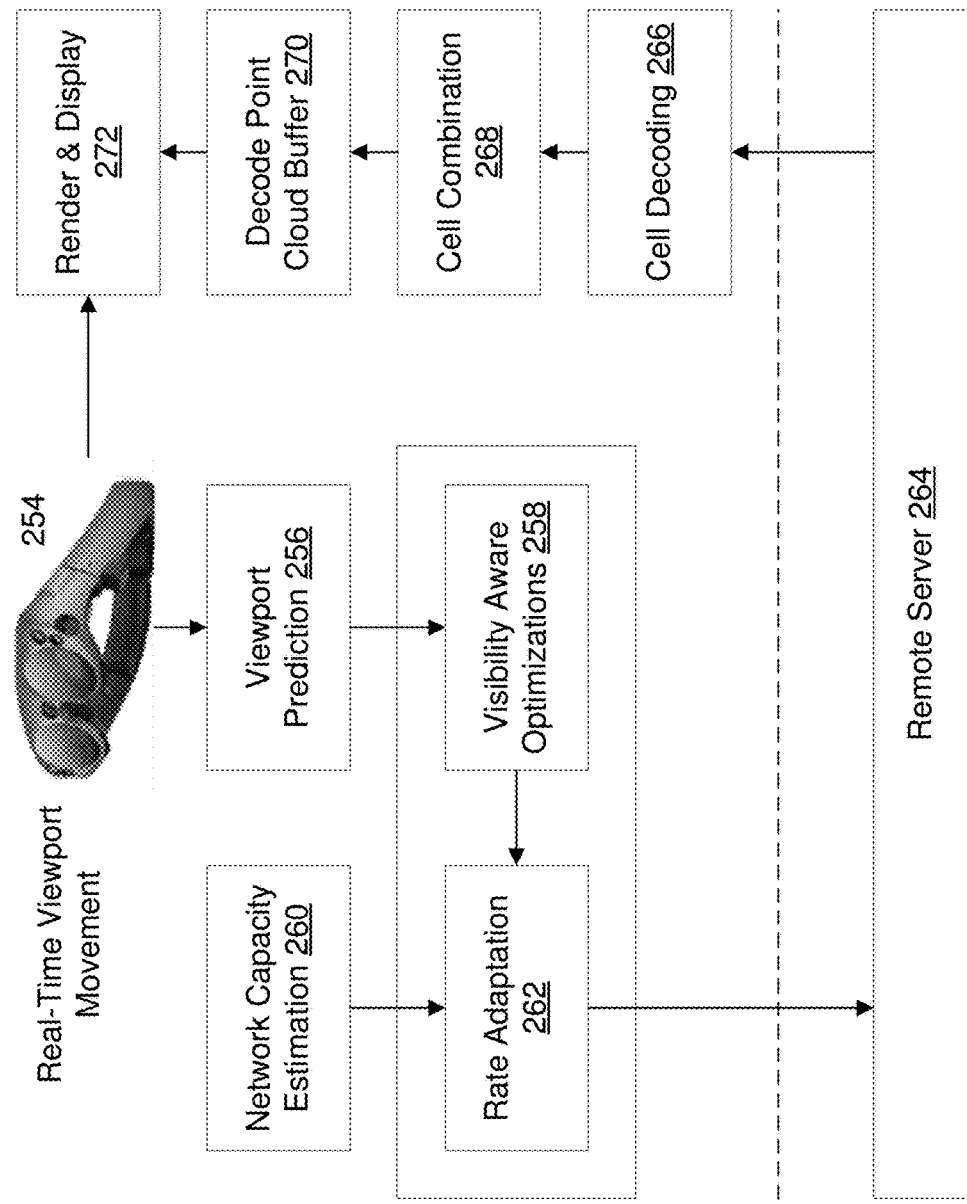

Referring to FIG. 2H, one or more embodiments can include an integration of components into a system 252. A portion of ViVo's logic resides on a client device (communication device) 254 that wirelessly communicates with a stateless server, not requiring support from a cloud or edge server for offloading/acceleration. The segmentation, encoding, and DV model training are performed offline (not shown in the figure). At runtime, before playing a video, the player first fetches a small manifest file from the server 264. It contains each cell's position, size, the number of points, and the DV model. During the playback, ViVo keeps collecting the viewport trajectory and performing Viewport Prediction (VP) 256. The VP results are utilized by DV, VV, and OV 258. Subsequently, embodiments execute ViVo a lightweight throughput-based rate adaptation algorithm to assess if the PDLs chosen by the optimizations can be satisfied by the estimated network capacity 260. If not, the rate adaptation module 262 can globally reduce the PDLs. After rate adaptation, the rate adaptation module 262 issues ViVo, and the requests for the cells to the server 264 over a communication network. With the help of VP 256, embodiments (pre)fetch the cells in the predicted ViVo viewport and decodes them with multiple decoders 266, before merging 268 and caching them in the Decoded Point Cloud Buffer 270. At the playback time (i.e., when the ground-truth viewport is determined), embodiments can render the decoded ViVo point cloud data in the buffer 272. Thus, the motion-to-photon latency can be the rendering latency, which is measured to be low (e.g., 6 ms for a frame with around 100K points on SGS8).

In one or more embodiments, the processing is executed on a per-frame basis. Benefitting from our various performance optimizations, it can be performed at a line rate of 30+ FPS. Meanwhile, embodiments can properly decode the received ViVo cells and renders them at 30 FPS based on the user's viewport. It maintains a decoded cell buffer of 5 frames. The shallow buffer facilitates a short VP window and therefore good VP accuracy. Embodiments determine the viewport visibility, occlusion ViVo visibility, and distance visibility all on the client side. This helps address the scalability issue faced by a server-side approach.

One or more embodiments implement the PtCl video player on Android devices and its video server on Linux. For performance consideration, embodiments use Android NDK (C++) for visibility determination, scheduling, cell fetching, and PtCl decoding. Embodiments cross-compile the Draco library for decoding PtCls on Android devices and utilize GPU-accelerated OpenGL ES for rendering PtCls. Unless otherwise mentioned, PtCl decoding is performed over four threads. Implementation does not require root access. Embodiments test ViVo on multiple mainstream mobile devices, including SGS8, SGS9, SGS10, and Mate20, all loaded with Android OS 7.0+. Embodiments implement the video server in C/C++ on Linux (tested on Ubuntu ViVo 18.04, CentOS 7 and RHEL 7.6 distributions). The client-server communication is realized by a custom protocol over TCP, but it can also be implemented using standard application layer protocols such as HTTP(S). In total, embodiments can comprise of 8,000+ ViVo lines of code (LoC): 2,000+ LoC in Java and 4,000+ LoC in C++ for the video player, and 2,000+ LoC in C++ for the server.

Embodiments can include client devices (communication devices) are off-the-shelf SGS8 (Android 7.0, Snapdragon 835 system-on-chip, 4 GB RAM) and SGS10 (Android 9.0, Snap dragon 855 system-on-chip, 8 GB RAM). Unless otherwise mentioned, embodiments use the latter. Embodiments can include a commodity server with Intel Xeon CPU E5-2680 v4 @ 2.40 GHz and Ubuntu 18.04 as the video server. For controlled experiments, we connect the mobile device and the video server using a commodity 802.11ac AP at 5 GHz. The end-to-end peak downlink throughput is 320+ Mbps, and the client-server PING latency is <10 ms. In addition to testing on bare WiFi network, embodiments assess ViVo's performance over fluctuating network conditions in a reproducible fashion, by using the tc tool to replay 10 network bandwidth traces collected at multiple locations from a large commercial LTE network in the U.S. The average bandwidth of these traces ranges from 73 Mbps to 174 Mbps, and the standard deviation ranges from 13 Mbps to 28 Mbps. During the replay, embodiments can also use to increase the end-to-end latency tc-netem to 60 ms, a typical RTT for today's LTE networks. For real-world experiments, embodiments can use a commercial 5G mmWave network in the U.S. (launched in 2019).

One or more embodiments assess the effectiveness of individual optimizations: VV, OV, and DV. Embodiments replay all 16 users' viewport traces, and measure two metrics: traffic volume and visual quality. Embodiments can incur the key tradeoff that needs to balance. For VV, embodiments of ViVo baseline fetches the whole PtCl without segmentation; uses ViVo 100×100×100 cm3 cells, and dynamically adjusts the viewport according to the VV algorithm. For the baseline of OV and DV, it uses 100×100× 100 cm3 cells and a very large viewport of 120°; only cells overlapping with the viewport can be fetched. For a fair comparison, uses the same ViVo configuration as above when evaluating OV or DV. The rationale of having such a baseline is to separate the impact of OV and DV themselves from that of segmentation. Embodiments can include on unthrottled 802.11ac WiFi networks and configure the baseline scheme to fetch the content at the highest PDL. For ViVo, the initial PDLs for all cells are set to the highest; the three optimizations may selectively reduce some of them based on the optimization logic.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A-2G, and 3. For example, virtualized communication network 300 can facilitate in whole or in part providing adjusted video content according to point cloud density. In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
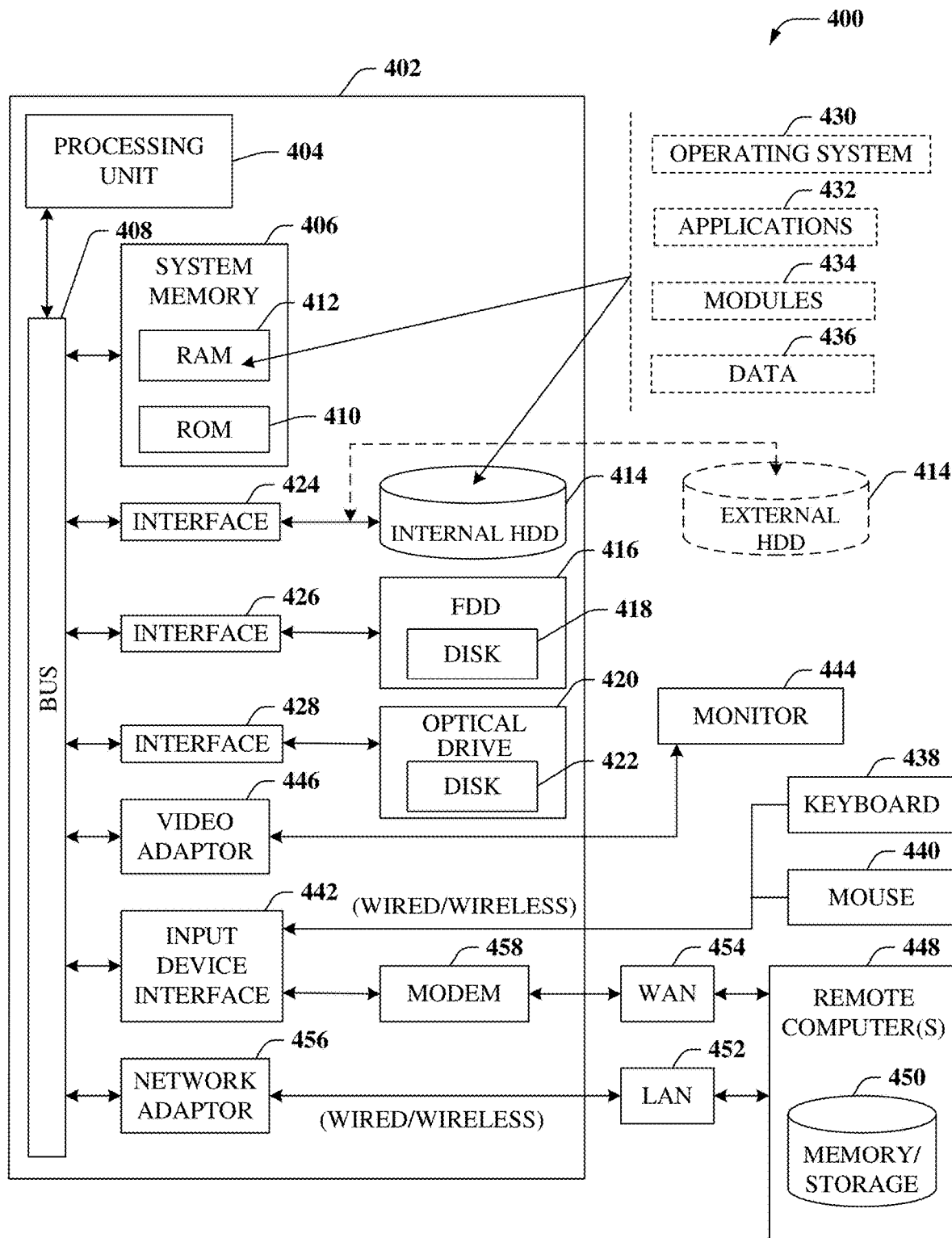
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part providing adjusted video content according to point cloud density. Further, server 208 and communication device 204 can comprise computing device 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
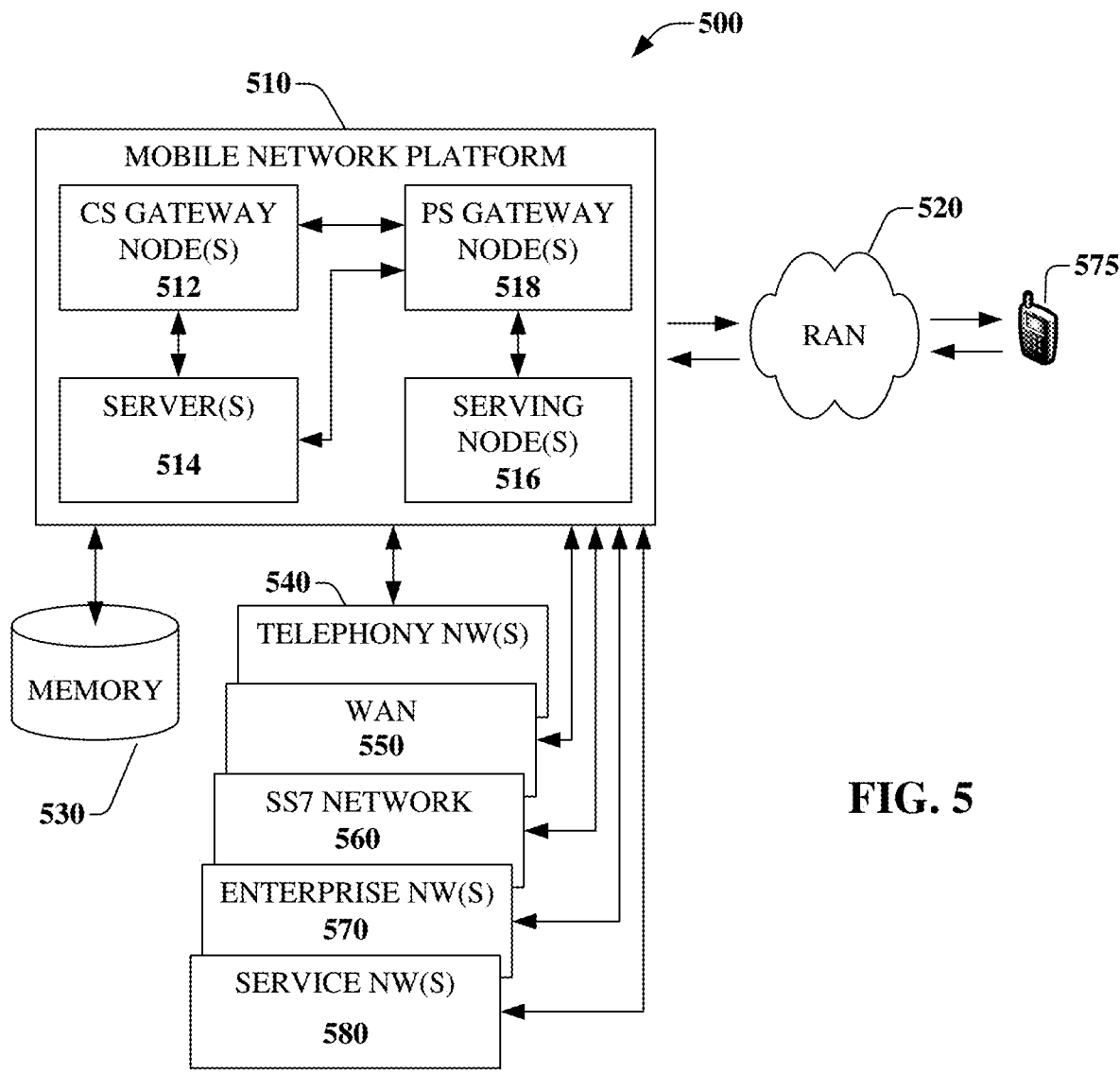
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part providing adjusted video content according to point cloud density. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
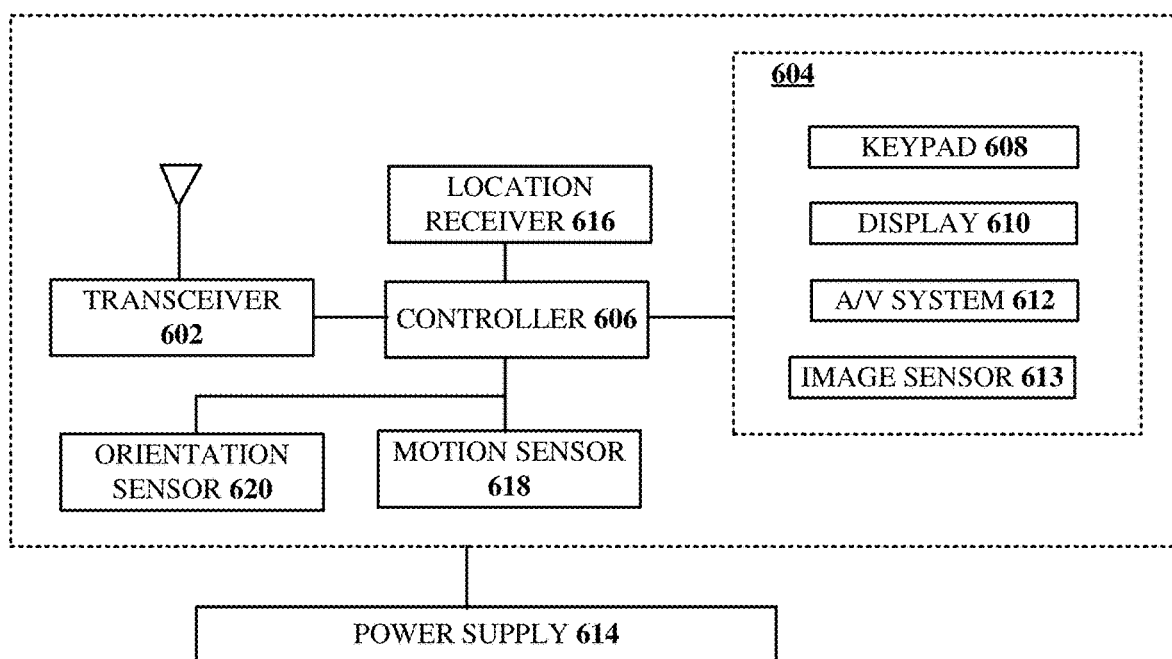
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in providing adjusted video content according to point cloud density. Further, server 208 and communication device 204 can comprise communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth©, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Subject matter included in the attached appendices A and B are incorporated herein by reference. Portions of the subject matter of the attached appendices A and B can be combined with portions of the embodiments described herein.

What is claimed is:

1. A device, comprising: a processing system including a processor; and a memory that stores executable instructions that, when executed by the device, facilitate performance of operations, the operations comprising:

determining a quality parameter for each of a group of adjusted video content resulting in a group of quality parameters;

determining a quality parameter threshold associated with the group of quality parameters;

receiving, over a communication network, a request for video content from a video content application on a communication device;

determining a first distance from a first viewpoint to a point-cloud object within the video content application of the communication device;

selecting a first adjusted video content from the group of adjusted video content based on the first distance from the first viewpoint to the point-cloud object and a first quality parameter of the group of quality parameters associated with the first adjusted video content that is above the quality parameter threshold;

providing, over the communication network, the first adjusted video content to the communication device;

determining a second distance from a second viewpoint to the point-cloud object within the video content application of the communication device in response to detecting a change from the first viewpoint to the second viewpoint;

selecting a second adjusted video content from the group of adjusted video content based on the second distance from the second viewpoint to the point-cloud object and a second quality parameter of the group of quality parameters associated with the second adjusted video content that is above the quality parameter threshold; and providing, over the communication network, the second adjusted video content to the communication device.

2. The device of claim 1, wherein the second distance is shorter than the first distance, wherein the second quality parameter is higher than the first quality parameter.

3. The device of claim 2, wherein a first point-cloud density associated with the point-cloud object within the first adjusted video content is lower than a second point-cloud density associated with the point-cloud object within the second adjusted video content.

4. The device of claim 1, wherein the second distance is longer than the first distance, wherein the second quality parameter is lower than the first quality parameter.

5. The device of claim 4, wherein a third point-cloud density associated with the point-cloud object within the first adjusted video content is higher than a fourth point-cloud density associated with the point-cloud object within the second adjusted video content.

6. The device of claim 1, wherein the quality parameter for each of the group of adjusted video content comprises one of a structural similarity index (SSIM) or a peak signal to noise ratio (PSNR).

7. The device of claim 1, wherein the operations comprise determining an available bandwidth of the communication network between the device and the communication device, wherein the selecting of the first adjusted video content comprises selecting the first adjusted video content based on the available bandwidth.

8. The device of claim 1, wherein the selecting of the first adjusted video content comprises selecting the first adjusted video content in response to receiving user-generated input.

9. The device of claim 8, wherein the determining of the quality parameter for the each of the group of adjusted video content comprises determining the quality parameter for the each of the group of adjusted video content according to the user-generated input.

10. The device of claim 8, wherein the user-generated input comprises instructions for magnification of the video content.

11. The device of claim 1, wherein the video content comprises one of augmented reality video content, virtual reality video content, live video content, recorded video content, or a combination thereof.

12. The device of claim 1, wherein the video content application comprises a video game application.

13. A non-transitory, machine-readable medium, comprising executable instructions that, when executed by a server including a processor, facilitate performance of operations, the operations comprising:
receiving, over a communication network, a request for video content from a video content application on a communication device;
determining a first distance from a first viewpoint to a point-cloud object within the video content application of the communication device;
identifying a first point-cloud density of the point-cloud object according to the first distance;
selecting a first adjusted video content from a group of adjusted video content based on the point-cloud object within the first adjusted video content being associated with the first point-cloud density;
providing, over the communication network, the first adjusted video content to the communication device;
determining a second distance from a second viewpoint to the point-cloud object within the video content application of the communication device in response to detecting a change from the first viewpoint to the second viewpoint;
identifying a second point-cloud density of the point-cloud object according to the first distance;
selecting a second adjusted video content from the group of adjusted video content based on the point-cloud object within the second adjusted video content being associated with the second point-cloud density; and
providing, over the communication network, the second adjusted video content to the communication device.

14. The non-transitory, machine-readable medium of claim 13, wherein the second distance is shorter than the first distance, wherein the first point-cloud density associated with the point-cloud object within the first adjusted video content is lower than the second point-cloud density associated with the point-cloud object within the second adjusted video content.

15. The non-transitory, machine-readable medium of claim 14, wherein a first quality parameter is associated with the first adjusted video content and a second quality parameter is associated with the second adjusted video content, wherein the first quality parameter lower than the second quality parameter.

16. The non-transitory, machine-readable medium of claim 13, wherein the second distance is longer than the first distance, wherein the first point-cloud density associated with the point-cloud object within the first adjusted video content is higher than the second point-cloud density associated with the point-cloud object within the second adjusted video content.

17. The non-transitory, machine-readable medium of claim 16, wherein a third quality parameter is associated with the first adjusted video content and a fourth quality parameter is associated with the second adjusted video content, wherein the third quality parameter higher than the fourth quality parameter.

18. The non-transitory, machine-readable medium of claim 13, wherein the video content comprises one of augmented reality video content, virtual reality video content, live video content, recorded video content, or a combination thereof.

19. The non-transitory, machine-readable medium of claim 13, wherein the video content application comprises a video game application.

20. A method, comprising:
receiving, by a processing system including a processor, over a communication network, a request for video content from a video content application on a communication device;
determining, by the processing system, a first distance from a first viewpoint to a point-cloud object within the video content application of the communication device;
determining, by the processing system, a first point-cloud density associated with the point-cloud object based on the first distance;
selecting, by the processing system, a first adjusted video content from a group of adjusted video content based on the point-cloud object within the first adjusted video content being associated with the first point-cloud density;
determining, by the processing system, that a first quality parameter associated with the first adjusted video content is above a quality parameter threshold;
providing, by the processing system, over the communication network, the first adjusted video content to the communication device;
determining, by the processing system, a second distance from a second viewpoint to the point-cloud object within the video content application of the communication device in response to detecting a change from the first viewpoint to the second viewpoint;
determining, by the processing system, a second point-cloud density associated with the point-cloud object based on the second distance;
selecting, by the processing system, a second adjusted video content from the group of adjusted video content based on the point-cloud object within the second adjusted video content being associated with the second point-cloud density;
determining, by the processing system, that a second quality parameter associated with the second adjusted video content is above the quality parameter threshold; and
providing, by the processing system, over the communication network, the second adjusted video content to the communication device.

* * * * *